(12) United States Patent
Inoue

(10) Patent No.: US 8,251,345 B2
(45) Date of Patent: Aug. 28, 2012

(54) SUCK-BACK VALVE

(75) Inventor: Atsushi Inoue, Gyoda (JP)

(73) Assignee: Surpass Industry Co., Ltd., Gyoda (JP)

( * ) Notice: Subject to any disclaimer, the term of this patent is extended or adjusted under 35 U.S.C. 154(b) by 380 days.

(21) Appl. No.: 12/541,581

(22) Filed: Aug. 14, 2009

(65) Prior Publication Data

US 2010/0038567 A1 Feb. 18, 2010

(30) Foreign Application Priority Data

Aug. 18, 2008 (JP) ................................. 2008-209762

(51) Int. Cl.
*F16K 31/00* (2006.01)
(52) U.S. Cl. ...................... 251/63.4; 251/335.3; 239/119
(58) Field of Classification Search .................. 251/62, 251/63.4, 63.5, 63.6, 335.1, 335.3; 239/119; 222/571
See application file for complete search history.

(56) References Cited

U.S. PATENT DOCUMENTS

| 3,709,431 | A | * | 1/1973 | Channell et al. ............. 236/68 R |
| 3,898,403 | A | * | 8/1975 | Grayson et al. ............. 200/83 Q |
| 6,029,903 | A | * | 2/2000 | Fukano et al. ............... 239/119 |
| 6,199,582 | B1 | | 3/2001 | Matsuzawa et al. |
| 6,213,106 | B1 | * | 4/2001 | H.ang.kansson ............. 251/63.4 |
| 6,932,318 | B2 | * | 8/2005 | Igarashi ........................ 251/60 |
| 2003/0178504 | A1 | | 9/2003 | Fukano et al. |
| 2004/0195534 | A1 | | 10/2004 | Ijichi et al. |
| 2010/0230626 | A1 | * | 9/2010 | Inoue ............................. 251/356 |

FOREIGN PATENT DOCUMENTS

| EP | 0864792 A2 | 9/1998 |
| JP | 3276936 B2 | 4/2002 |
| JP | 2002-316085 | 10/2002 |
| JP | 2005-090639 A | 4/2005 |

\* cited by examiner

*Primary Examiner* — Eric Keasel
(74) *Attorney, Agent, or Firm* — Muncy, Geissler, Olds & Lowe, PLLC

(57) ABSTRACT

A suck-back valve having an open/close valve with a suck-back function is provided. The suck-back valve includes a suck-back chamber formed in a valve internal channel of the open/close valve, a piston shaft portion and an open/close pressuring member to apply pressure to a valve piece, bellows that accommodate the piston shaft portion inside and that are connected to the open/close pressuring member at one end and are supported by a casing at the other end, wherein a two-step operation is performed at the time of a closing operation of the valve piece, including a valve closing operation step in which the piston shaft portion moves to the fully closed position of the valve piece, and a suck-back operation step in which the piston shaft portion and the open/close pressuring member further move from the fully closed position of the valve piece to increase the volume of the suck-back chamber.

4 Claims, 7 Drawing Sheets

SUCK-BACK VALVE

This nonprovisional application claims priority under 35 U.S.C. §119(a) to Japanese Patent Application No. 2008-209762, which was filed in Japan on Aug. 18, 2008, and which is herein incorporated by reference.

BACKGROUND OF THE INVENTION

1. Field of the Invention

The present invention relates to a suck-back valve having a suck-back function that prevents the occurrence of leakage during the fully closing operation of an open/close valve.

This application is based on Japanese Patent Application No. 2008-209762, the content of which is incorporated herein by reference.

2. Description of Related Art

Conventionally, for example, for an open/close valve disposed in a pipeline system for liquid such as drug solution, a separate valve exclusively for "suck-back" has been additionally provided to prevent leakage (dripping of the fluid) that occurs during the fully closing operation. Such a valve exclusively for suck-back operates synchronously with closing operations of the open/close valve, and it is possible to prevent leakage by actuating a diaphragm in a direction that increases the volume of a suck-back chamber, thus sucking liquid on the outlet side to the suck-back chamber side (for example refer to Japanese Unexamined Patent Application, Publication No. 2002-316085).

However, in the above-described conventional valve exclusively for suck-back, because the open/close valve and the valve exclusively for suck-back are separate entities, there is a problem in that the apparatus as a whole requires a larger space for installation.

In addition, the open/close valve and the valve exclusively for suck-back are respectively operated by actuators that use air pressure, etc.; therefore, it is difficult to synchronize both actuators to reliably prevent leakage.

Furthermore, a suck-back valve using a diaphragm forms a large dead space in the suck-back chamber, thus posing the problem of low liquid replaceability. Moreover, in order to realize a large suck-back volume, the suck-back valve using a diaphragm requires an enormous suck-back chamber because the ratio of change of volume of the suck-back chamber when actuating the diaphragm is low, and thus, it is not practical.

Against such a background, there has been a need for a suck-back valve in which an open/close valve is provided with a suck-back function, i.e., a suck-back valve in which the open/close valve and the valve exclusively for suck-back are integrated, in order to reduce the installation space and to solve the problems of synchronization. In addition, in such a suck-back valve, a desirable suck-back structure is one that is capable of increasing the fluid replaceability by eliminating dead space in the suck-back chamber and capable of increasing the volume of fluid that can be sucked back.

BRIEF SUMMARY OF THE INVENTION

The present invention has been conceived in light of the above situation, and an object thereof is to provide a suck-back valve with an open/close valve having a suck-back function.

To solve the above-described problems, the present invention adopts the following solutions.

A suck-back valve according to one aspect of the present invention is a suck-back valve in which an open/close valve that includes an elastic member that biases a valve piece in an opening/closing direction carries out a valve piece opening/closing operation by receiving fluid pressure on an open/close operation portion that is provided with a piston main body and a piston biasing member, and is provided with a suck-back function to prevent leakage during the fully closing operation, the suck-back valve including a suck-back chamber formed in a valve internal channel in the open/close valve, a piston shaft portion that connects the piston main body and an open/close pressuring member that moves in the suck-back chamber in the axial direction to apply pressure to the valve piece, and bellows that accommodate the piston shaft portion inside, separating the open/close operation portion from the valve internal channel, and that are connected to the open/close pressuring member at one end and are supported by a casing at the other end. A two-step operation is carried out at the time of a closing operation of the valve piece, including a valve closing operation step in which the piston shaft portion, along with the piston main body and the open/close pressuring member, moves to the fully closed position of the valve piece, and a suck-back operation step in which the piston shaft portion and the open/close pressuring member further move from the fully closed position of the valve piece so as to increase the volume of the suck-back chamber.

With such a suck-back valve according the above-described aspect, it is possible to carry out opening/closing of the valve and suck-back for preventing leakage using a single actuator because a suck-back chamber formed in a valve internal channel of the open/close valve, a piston shaft portion that connects the piston main body and an open/close pressuring member that moves in the suck-back chamber in the axial direction to apply pressure to a valve piece, and bellows that accommodate the piston shaft portion inside, separating an open/close operation portion from the valve internal channel, and that are connected to the open/close pressuring member at one end and are supported by a casing at the other end are provided; and because a two-step operation is carried out at the time of a closing operation of the valve piece, including a valve-closing operation step in which the piston shaft portion, along with the piston main body and the open/close pressuring member, moves to the fully closed position of the valve piece, and a suck-back operation step in which the piston shaft portion and the open/close pressuring member further move from the fully closed position of the valve piece so as to increase the volume of the suck-back chamber.

In the suck-back operation step that increases the volume of the suck-back chamber, because the bellows that separate the open/close operation portion from the liquid has a large extension/contraction function in the axial direction, it is possible to increase the amount of increase in volume by easily ensuring a sufficient stroke (the amount of movement) by which the piston shaft portion and the open/close pressuring member move in the axial direction; and thus, it is possible to have a suck-back volume that is equal to almost the entire volume of the suck-back chamber. In addition, by adopting such bellows, a dead volume can be eliminated because the bellows fill the suck-back chamber.

In the above-described aspect, it is preferable that an outlet channel of the valve internal channel formed downstream of the valve piece passes through a concave portion formed on the bottom surface of the suck-back chamber, and accordingly, fluid flowing in the valve internal channel flows out without passing through the suck back chamber. Therefore, the suck-back chamber does not have dead space in which liquid may remain during the closing operation of the valve piece.

In the above-described aspect, it is preferable that a suck-back volume adjusting portion that controls the amount of axial movement of the piston shaft portion be provided, and accordingly, it is possible to optimize the suck-back volume by appropriately adjusting the suck-back volume depending on various conditions.

According to the present invention described above, it is possible to carry out the opening/closing operation of the open/close valve and the suck-back function using a single actuator (open/close operation portion), and it is possible to provide a suck-back valve having the suck-back function in the open/close valve. As a result, an open/close valve and a valve exclusively for suck-back are integrated in the suck-back valve; therefore, a reduction of installation space becomes possible, and the problem of synchronization of the actuator can be solved.

Additionally, because adopting the bellows makes it possible to ensure a large stroke at the time of suck-back and to have a suck-back volume that is equal to almost the entire volume of the suck-back chamber, it is possible to increase the volume of liquid that can be sucked back, while suppressing an increase in footprint. Moreover, as the bellows eliminate the dead volume by filling the suck-back chamber, an advantage is also afforded in that the fluid replaceability in the suck-back chamber improves.

DETAILED DESCRIPTION OF THE INVENTION

Figure 1:
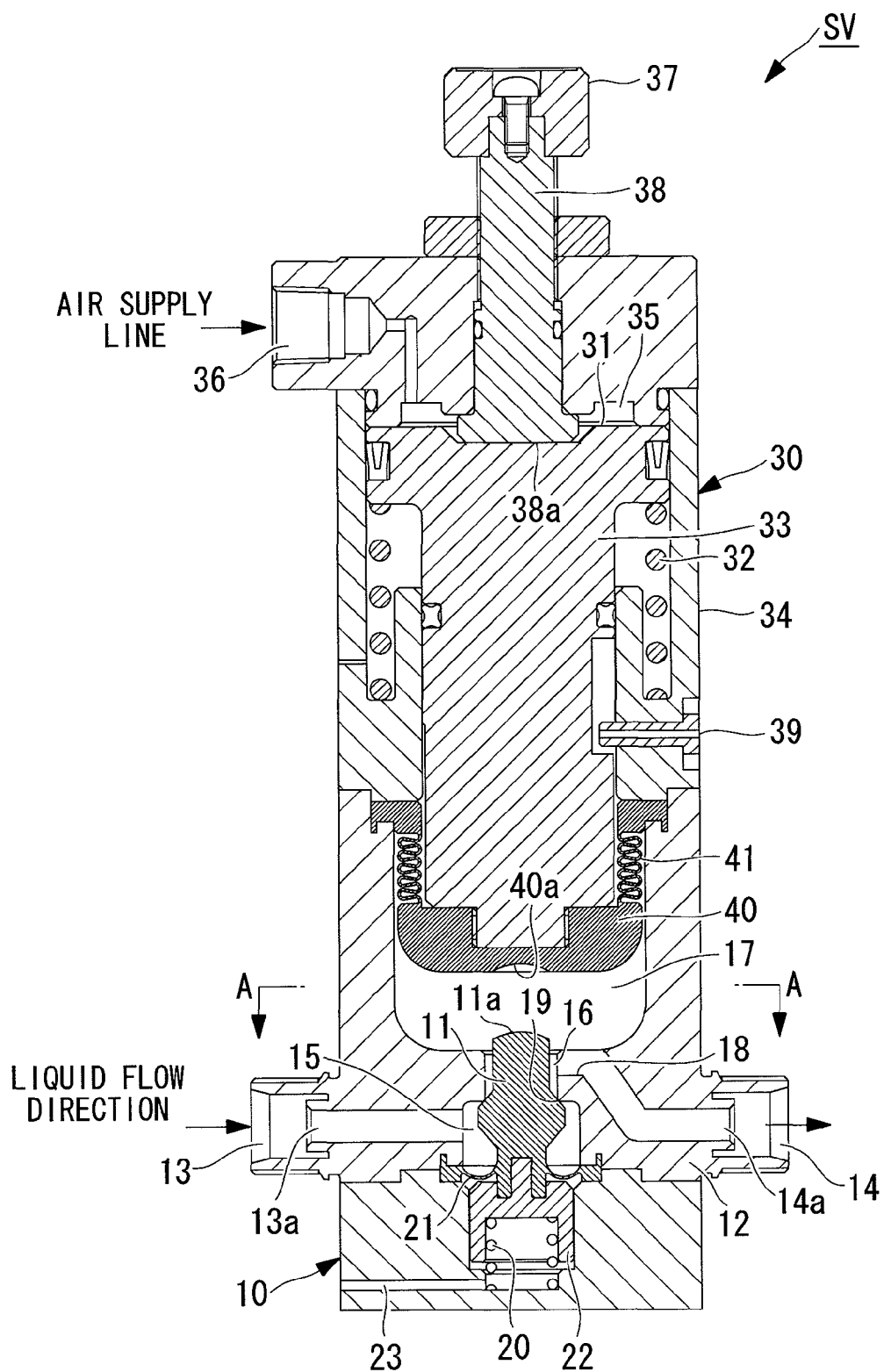
FIG. 1 is a cross-sectional view showing an embodiment of a suck-back valve according to the present invention, showing an initial state where an open/close valve is fully closed.

An embodiment of a suck-back valve according to the present invention will be described below referring to the drawings.

A suck-back valve SV shown in FIGS. 1 to 6 is configured such that an open/close valve 10 that is disposed in a channel in which liquid such as drug solution flows and that has a suck-back function for preventing leakage while fully closing is integrated with an actuator 30 for the open/close operation. In other words, in the suck-back valve SV, the open/close valve 10, having a valve coil spring (elastic member) 20 that biases a valve piece 11 in the open/close direction, carries out the open/close operation of the valve piece 11 by receiving air pressure (fluid pressure) on the actuator 30 (open/close operation portion) provided with a piston main body 31 and a piston coil spring (piston biasing member) 32 and has a suck-back function that prevents leakage during the fully closing operation.

Figure 2:
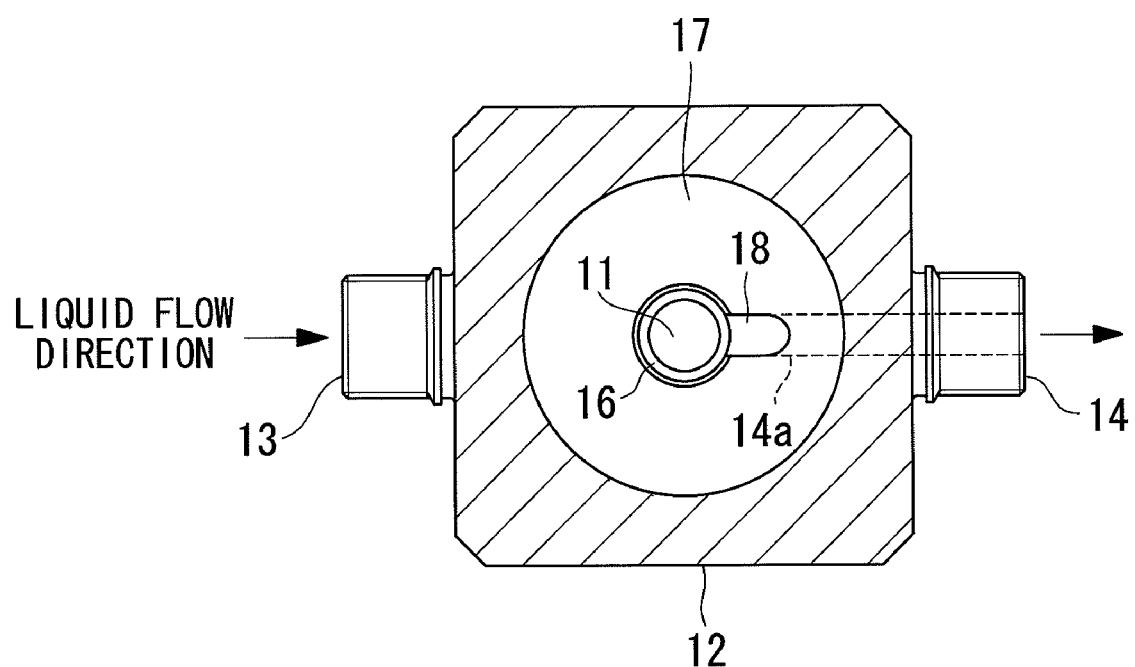
FIG. 2 is a cross-sectional view along A-A in FIG. 1.
Figure 3:
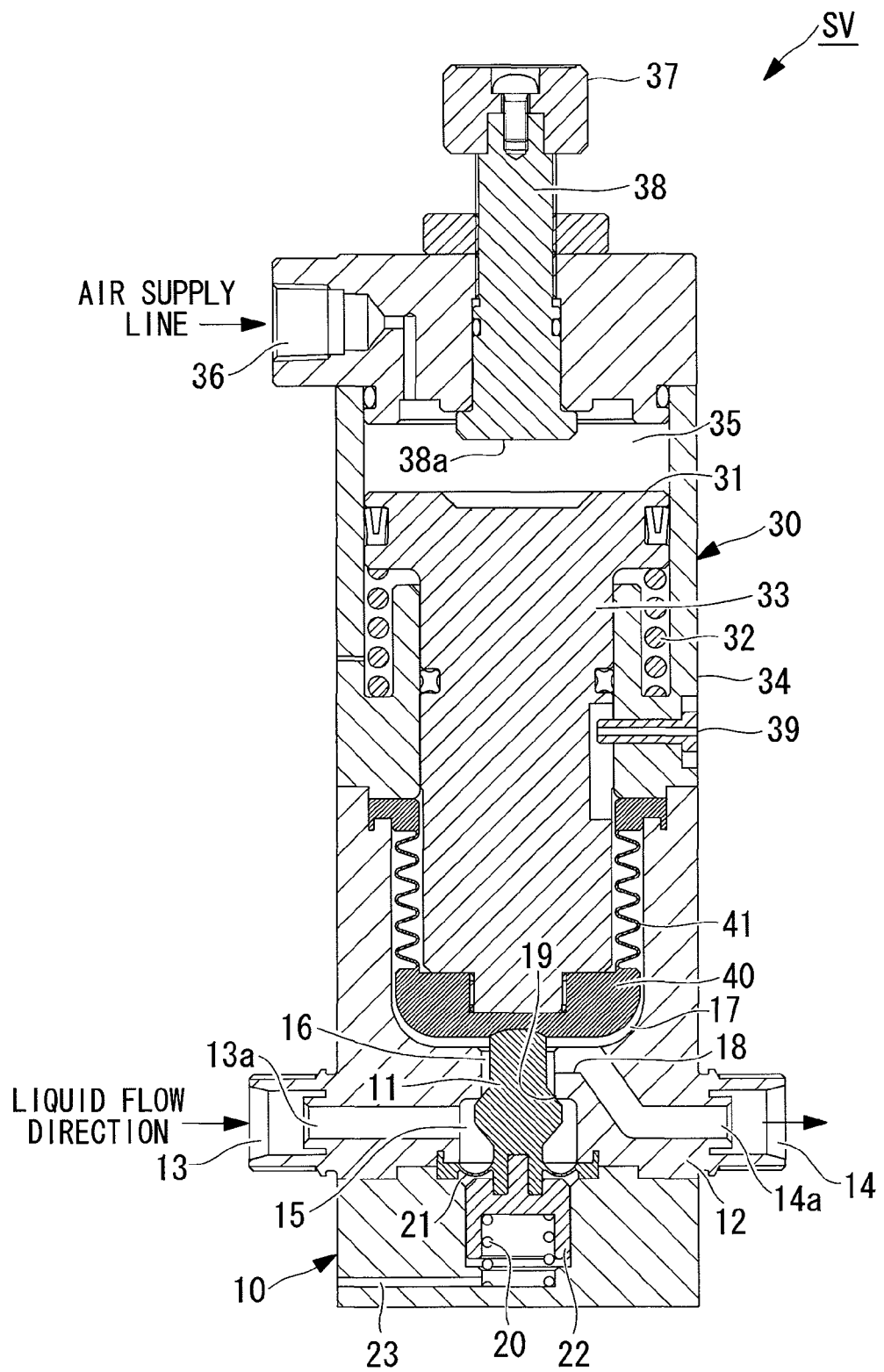
FIG. 3 is a cross-sectional view of the suck-back valve shown in FIG. 1, showing a state immediately before the valve piece of the open/close valve opens.
Figure 4:
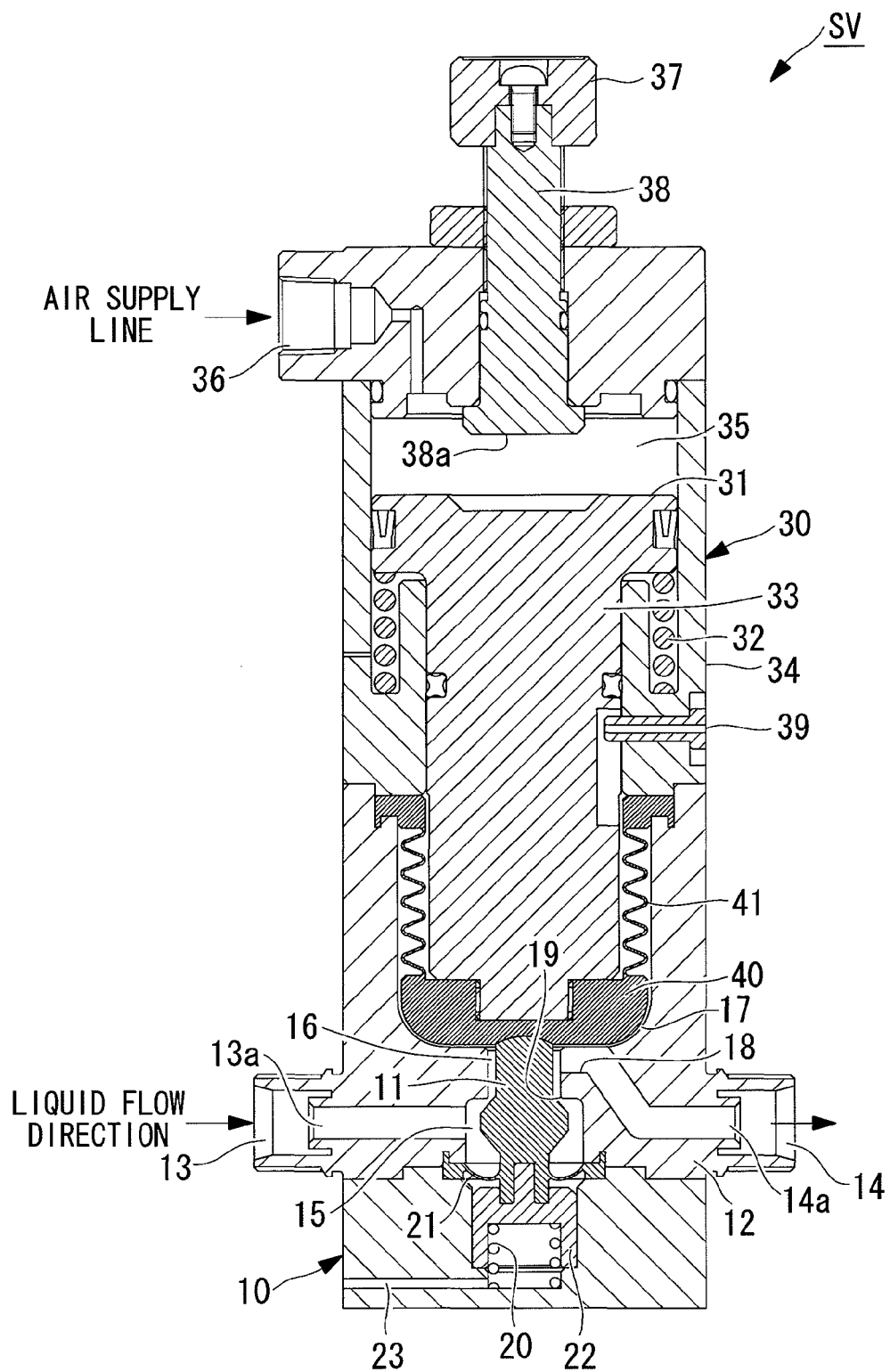
FIG. 4 is a cross-sectional view of the suck-back valve shown in FIG. 1, showing a liquid flowing state in which the valve piece of the open/close valve is open.
Figure 5:
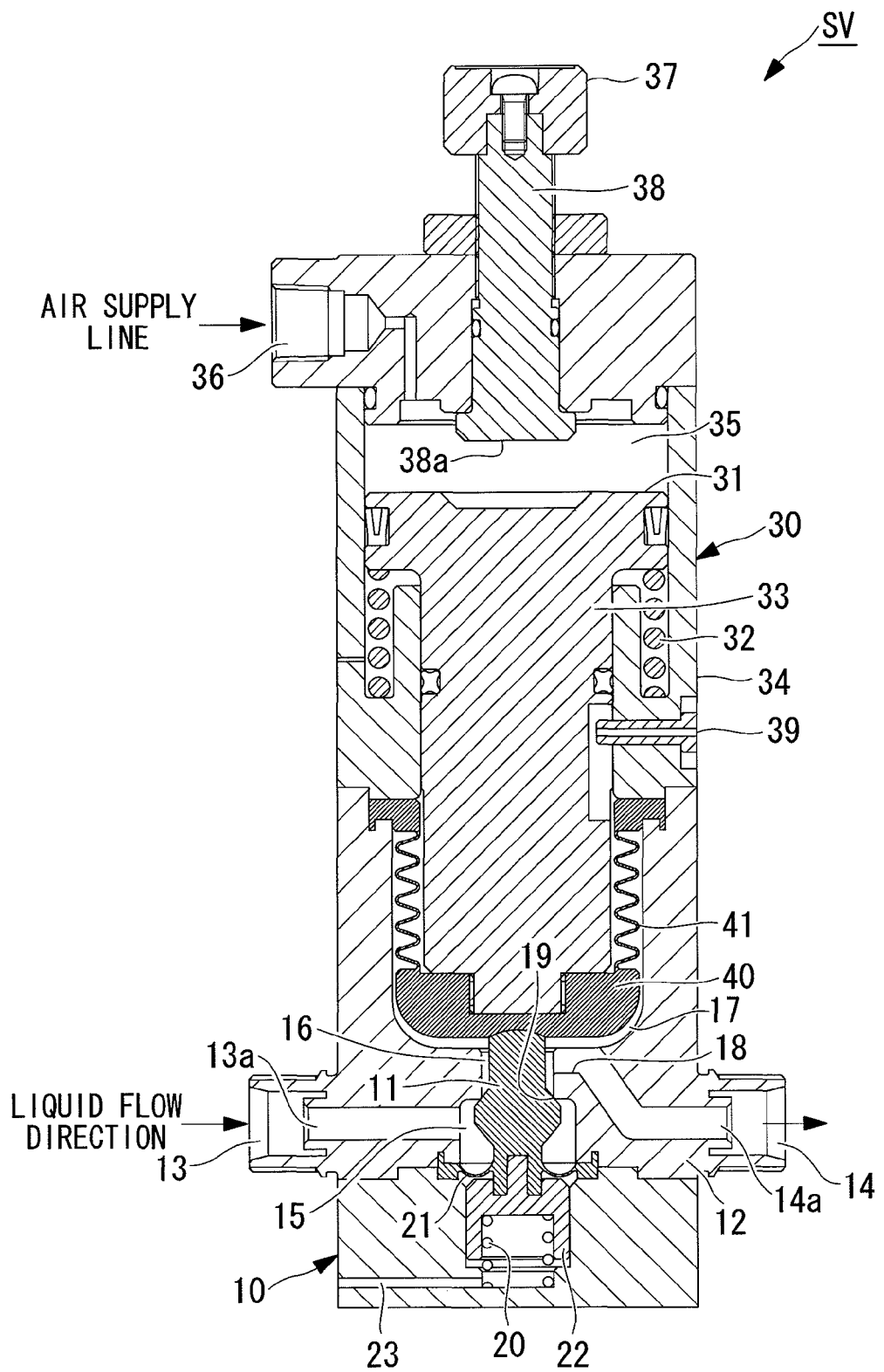
FIG. 5 is a cross-sectional view of the suck-back valve shown in FIG. 1, showing a state immediately before suck-back, where the valve piece of the open/close valve is closed.
Figure 6:
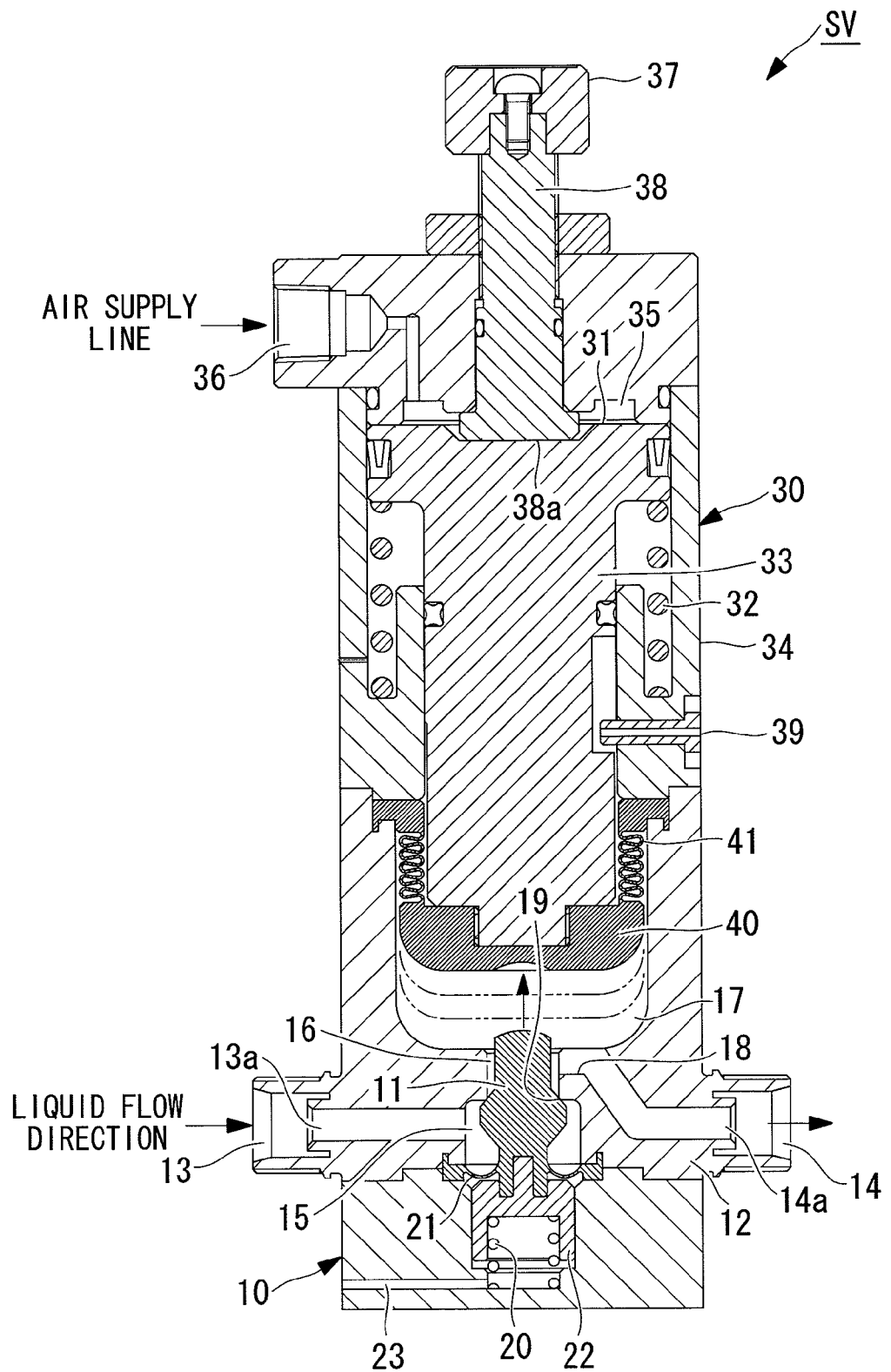
FIG. 6 is a cross-sectional view of the suck-back valve shown in FIG. 1, showing a suck-back state.

Note that FIGS. 1 to 6 show individual states of the suck-back valve SV. FIG. 1 shows the initial state; FIG. 2 shows a cross-sectional view along A-A in FIG. 1; FIG. 3 shows a state immediately before the valve piece 11 is opened; FIG. 4 shows a liquid flowing state where the valve piece 11 is open; FIG. 5 shows a state immediately before suck-back where the valve piece 11 is closed; and FIG. 6 shows the suck-back state.

In the basic configuration of the open/close valve 10, a valve main body (casing) 12 is provided with a fluid inlet 13 and a fluid outlet 14, and the valve piece 11 that opens and closes a fluid channel 16 is disposed in an internal space 15 of the valve main body 12. A suck-back chamber 17 that communicates with the internal space 15 via the fluid channel 16 is formed above the fluid channel 16. This suck-back chamber 17 is a part of a channel in which liquid flows inside the open/close valve 10 (hereafter, referred to as the "valve internal channel"); however, it is desirable to form a concave portion 18 on the bottom surface of the suck-back chamber 17 and to use this concave portion 18 as a part of an outlet channel that communicates with the fluid outlet 14.

Figure 7:
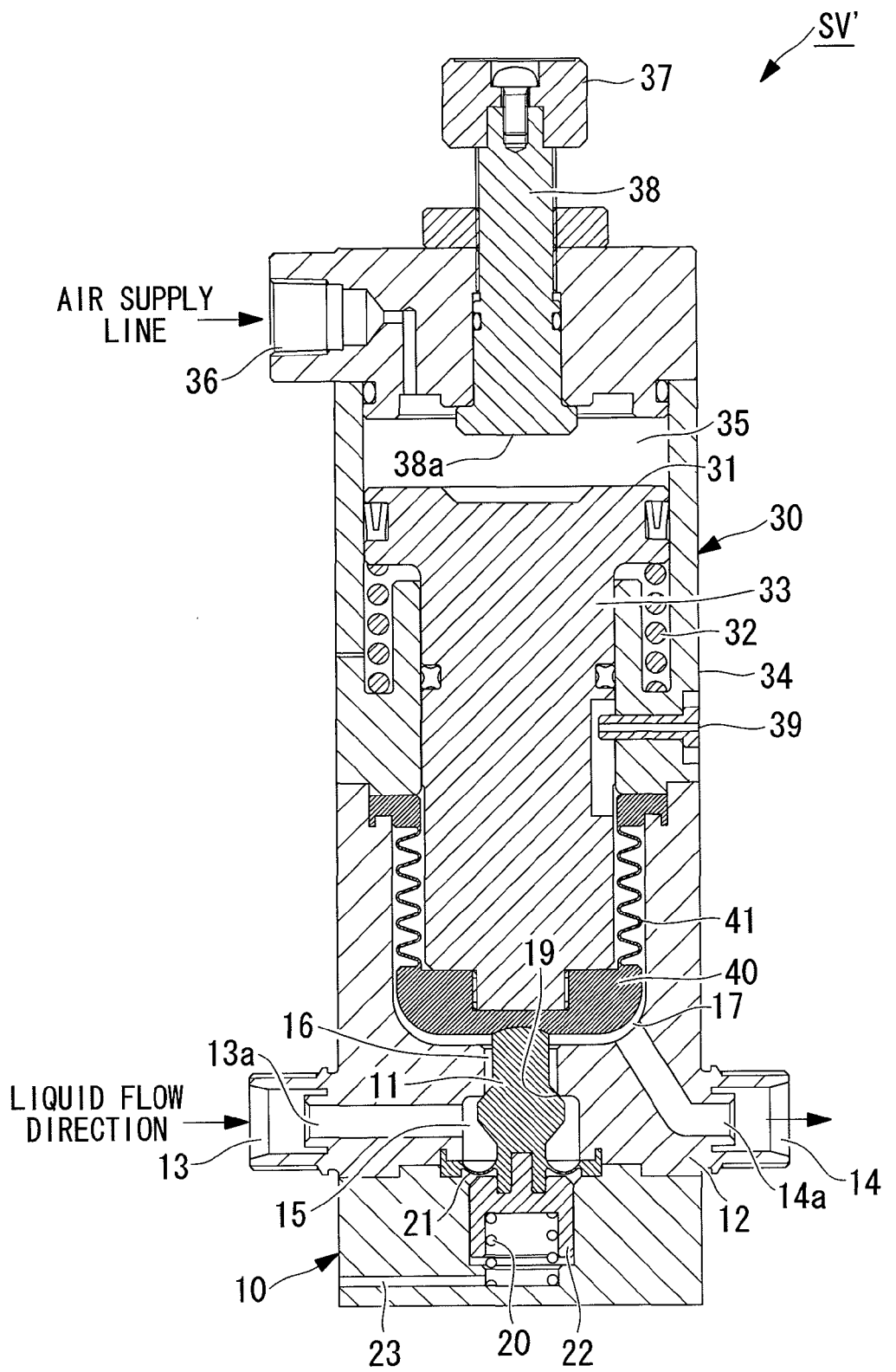
FIG. 7 is a cross-sectional view showing a modification of the suck-back valve according to the present invention, and a cross-sectional view showing a state immediately before the valve piece of the open/close valve is opened.

Note that, regarding the concave portion 18 described above, a configuration without the concave portion 18 may be adopted by, for example, as in a suck-back valve SV' shown as a modification in FIG. 7, using the suck-back chamber 17 as a part of the valve internal channel, i.e., by using the suck-back chamber 17 as a part of the outlet channel that communicates with the fluid outlet 14.

The valve piece 11 described above moves in the internal space 15 in the up/down direction by receiving pressure from an open/close pressuring member 40 that moves in the axial direction (up/down direction) in the suck-back chamber 17 due to the operation of the actuator 30, described later, thus opening/closing the fluid channel 16 formed inside the open/close valve 10. A seat portion 19 is provided at the top end of the internal space 15, i.e., at the inlet portion of the fluid channel 16. Then, in this open/close valve 10, the valve piece 11 closes the fluid channel 16 when the valve piece 11 moves upward, coming into contact with the seat portion 19, and the valve piece 11 opens the fluid channel 16 when the valve piece 11 moves downward, moving away from the seat portion 19.

The valve internal channel formed inside the open/close valve 10 is arranged in order of the flow direction in the open/close valve 10, starting with the fluid inlet 13, then an inlet channel 13a, the internal space 15, the fluid channel 16, the concave portion 18 formed on the bottom surface of the suck-back chamber 17, an outlet channel 14a, and the fluid outlet 14.

In addition, in the open/close valve 10 shown in the drawings, reference numeral 21 in the drawings is a diaphragm integral with the valve piece 11, 22 is a base part that is connected to the bottom end of the valve piece 11 and receives an upward bias from the coil spring 20, and 23 is a exhaust channel. Note that a size reduction of the diaphragm 21 is possible because the bottom portion of the valve piece 11 is narrowed to a small diameter.

The open/close pressuring member 40 that works together with the operation of the actuator 30 described later is disposed in the suck-back chamber 17. This open/close pressuring member 40 operates integrally with a piston shaft portion 33 connected thereto, which moves inside the suck-back chamber 17 in the axial direction, and is involved in the open/close operation of the valve piece 11 and the suck-back function. The piston shaft portion 33, which connects the piston main body 31 and the open/close pressuring member 40 that applies pressure to the valve piece 11 by moving inside the suck-back chamber 17 in the axial direction, is accommodated inside bellows 41 that are connected at the bottom end to the open/close pressuring member 40 and are supported by the casing such as the valve main body 12 at the top end. In other words, the bellows 41 separate the actuator 30 of the open/close operation portion from the fluid flowing in the valve internal channel of the open/close valve 11 by accommodating the piston shaft portion 33 inside.

The actuator 30 is provided with the piston main body 31 that is disposed in a cylinder portion 35 in the internal space formed in an actuator main body (casing) 34. In the example configuration shown in the drawings, it is configured so as to carry out the opening operation of the open/close valve 10 by pressing down the piston main body 31 with air pressure supplied from an air pressure supply port 36 that is provided in communication with the top portion of the cylinder portion 35 divided by the piston main body 31.

The piston main body 31 constantly receives an upward (the closing direction of the valve piece 11) bias from the coil spring 32; therefore, the open/close valve 10 shown in the drawings is a normally closed type that is always closed when there is no air pressure supply. In other words, the valve piece 11 is always in a closed state upon receiving the upward bias from the coil spring 20. However, pressing the piston main body 31 downward by supplying air pressure from the air pressure supply port 36 overcomes the bias of the coil spring 32 and lowers the open/close pressuring member 40 connected thereto via the piston shaft portion 33; further, this open/close pressuring member 40 overcomes the bias of the coil spring 20, lowering the valve piece 11. At this time, for example, as shown in FIG. 4, the bellows 41 become extended from a contracted state, and the valve piece 11 enters the open state by moving away from the seat portion 19.

Note that, because the downward pressure force from the piston main body 31 ceases when the air pressure supply from the air pressure supply port 36 stops, for example, as shown in FIG. 6, the open/close pressuring member 40 moves away from the valve piece 11 upon receiving the bias from the coil spring 32; further, the valve piece 11, upon receiving the bias from the coil spring 20, enters the closed state in which the valve piece 11 is brought into contact with the seat portion 19.

In addition, with respect to the suck-back function described later, the actuator 30 described above is provided with a suck-back volume adjusting portion that controls the amount of axial movement of the piston shaft portion 33 that moves integrally with the piston main body 31. This suck-back volume adjusting portion is, for example, a threaded shaft 38 that moves in the axial direction by operation of a knob 37, making it possible to adjust the amount by which the distal-end portion 38a protrudes into the cylinder portion 35 (the axial length). In other words, because increasing the amount that the distal-end portion 38a protrudes into the cylinder portion 35 decreases the range over which the piston main body 31 can move up (piston stroke), the suck-back volume (the change in volume of the suck-back chamber 17) determined by the operating level (the amount of movement) of the open/close pressuring member 40 also decreases.

Next, a description will be given about the open/close pressuring member 40, which is the member positioned between the valve piece 11 and both the piston main body 31 and the piston shaft portion 33 and opens/closes the valve piece 11 of the open/close valve 10 by operation of the actuator 30.

This open/close pressuring member 40 is connected to the bottom end of the piston shaft portion 33 that is provided on the bottom surface side of the piston main body 31 and is provided, on the bottom-end surface, with a concave portion 40a that fits with a valve piece convex portion 11a provided on the top portion of the valve piece 11. This open/close pressuring member 40 has an outside diameter substantially equal to the inside diameter of the suck-back chamber 17; furthermore, because the suck-back chamber 17 is completely separated from the actuator 30 by the open/close pressuring member 40 and the bellows 41, in a state in which the fluid channel 16 is closed by the valve piece 11, increasing the volume of the suck-back chamber 17 by upward movement of the open/close pressuring member 40 generates a suction force directed from the fluid outlet 14 toward the inside of the suck-back chamber 17. Note that, an air intake/exhaust port 39 that communicates with the atmosphere is provided in order to cope with volume changes that occur at the bottom portion of the piston main body 31 in response to the extension/contraction of the bellows 41, thus enabling smooth movement of the actuator 30.

In this way, the suck-back valve SV according to the present invention is provided with the suck-back chamber 17 formed in the valve internal channel of the open/close valve 10, the piston shaft portion 33 that connects the piston main body 31 and the open/close pressuring member 40 that applies pressure to the valve piece 11 by moving inside the suck-back chamber 17 in the axial direction, and the bellows 41 that accommodate the piston shaft portion 33 inside, separating the actuator 30 of the open/close operation portion from the valve internal channel, and that are connected to the open/close pressuring member 40 at one end while being supported by the casing 12 at the other end. In addition, at the time of the closing operation of the valve piece 11, this suck-back valve SV is configured to carry out a two-step operation, including a valve closing operation step in which the piston shaft portion 33, along with the piston main body 31 and the open/close pressuring member 40, moves to the fully closed position of the valve piece 11, and a suck-back operation step in which the piston shaft portion 33 and the open/close pressuring member 40 further move from the fully closed position of the valve piece 11 so as to increase the volume of the suck-back chamber 17.

The thus-configured suck-back valve SV is capable of carrying out opening/closing of the open/close valve 10 and suck-back for preventing leakage using a single actuator 30 because it is made so as to perform a two-step operation at the time of the closing operation of the valve piece 11, including the valve closing operation step in which the piston shaft portion 33, along with the piston main body 31 and the open/close pressuring member 40, moves to the fully closed position of the valve piece 11, and the suck-back operation step in which the piston shaft portion 33 and the open/close pressuring member 40 further move from the fully closed position of the valve piece 11 so as to increase the volume of the suck-back chamber 17.

In the suck-back operation step that increases the volume of the suck-back chamber 17, because the bellows 41 that separate the actuator 30 from the liquid handled in the open/close valve 10 has a large expansion/contraction function in the axial direction, it is possible to increase the amount of increase in volume by easily ensuring a sufficient stroke (the amount of movement) by which the piston shaft portion 33 and the open/close pressuring member 40 move in the axial direction.

In other words, in the initial state shown in FIG. 1, the piston main body 31 is not receiving air pressure, the piston shaft portion 33 and the open/close pressuring member 40 are pushed up by the bias from the coil spring 32, and the bellows 41 are in a contracted state. In addition, the valve piece 11 is in a state in which the open/close pressuring member 40 is moved away therefrom and is not applying pressure thereto; therefore, it is pushed up by the bias from the coil spring 20 and is in the fully closed state in which it is brought into contact with the seat portion 19.

In FIG. 3, the valve piece 11 is in a state immediately before it is opened, i.e., the valve piece 11 is in the fully closed position; the piston main body 31 is lowered upon receiving the air pressure, thereby pressing down the piston shaft portion 33 and the open/close pressuring member 40; and thus the bellows 41 are in the extended state. At this time, the open/close pressuring member 40 is in a position immediately before coming into contact with the valve piece 11 or, if it is in contact, it is in a position at which it does not press the valve piece 11. Therefore, because it is in a state in which it is not receiving pressure from the open/close pressuring member 40, the valve piece 11 is pushed up by the bias from the coil spring 20 and is in the fully closed state in which it is brought into contact with the seat portion 19.

Continuing to supply the air pressure from the state immediately before the valve is open, shown in FIG. 3, causes a shift to the liquid flowing state where the valve piece 11 is open, as shown in FIG. 4. In this state, because the open/close pressuring member 40 is in contact with the valve piece 11, applying downward pressure, the valve piece 11 is pressed down, overcoming the bias from the coil spring 20, and thus the valve piece 11 is in the fully opened state in which the valve piece 11 is moved away from the seat portion 19. In such a state with the valve piece 11 fully opened, the liquid flowing in from the fluid inlet 13 flows out from the fluid outlet 14 via the internal space 15 and the fluid channel 16. Because substantially the whole volume of the suck-back chamber 17 is filled at this time, with the bellows 41 in the extended state so as not to create a dead volume, it is possible to improve the liquid replaceability in the suck-back chamber 17.

FIG. 5 is a state in which the valve piece 11 is closed and suck-back is about to begin (a state where the valve closing operation step has been completed), effectively showing a situation substantially the same as in FIG. 3. In other words, by stopping the air pressure supply that applies pressure to the piston main body 31, the valve piece 11, which is released from receiving pressure from the open/close pressuring member 40, returns to the fully closed position due to the bias from the coil spring 20, and the piston main body 31 is in a state immediately before rising.

FIG. 6 shows a state in which suck-back is initiated after fully closing the valve piece 11 (suck-back operation step) and the open/close pressuring member 40 instantaneously rises upon receiving the bias from the coil spring 32, as shown in the drawing by imaginary lines. As a result, the volume of the suck-back chamber 17 suddenly increases causing negative pressure, which in turn, prevents leakage by sucking fluid remaining in the fluid outlet 14 and the outlet channel 14a. At this time, the open/close pressuring member 40 can have a large stroke by contraction of the bellows 41; therefore, it is possible to use substantially the entire volume of the suck-back chamber 17 for suck-back and to increase the change in volume of the suck-back chamber 17 at the time of suck-back.

In this way, increasing the change in volume of the suck-back chamber 17 increases the amount of liquid that can be sucked back, and it is possible to reliably prevent leakage. Moreover, because the bellows 41 are adopted, an increase of the suck-back volume is realized while suppressing an increase in footprint.

In addition, for the outlet channel of the valve internal channel formed downstream of the valve piece 11, because fluid flows through the concave portion 18 formed on the bottom surface of the suck-back chamber 17, in the liquid flowing state shown in FIG. 4, the fluid flowing in the valve internal channel flows out to the fluid outlet 14 without passing through the suck-back chamber 17. Therefore, the suck-back chamber 17 does not have dead space (a concave portion that is lower than the outlet channel 14a) in which liquid may remain during the closing operation of the valve piece 11 shown in FIG. 5. In other words, because the liquid in the suck-back chamber 17 flows through the lowest concave portion 18, there is no such problem as liquid remaining in the dead space after the valve closing becoming solidified and acting as a cause of a failure.

In addition, because the suck-back volume adjusting portion, which controls the amount of axial movement of the piston shaft portion 33 via the threaded shaft 38 that is rotationally operable by the knob 37, is provided, it is possible to optimize the suck-back volume by appropriately adjusting the suck-back volume depending on various conditions of the fluid channel in which the suck-back valve SV is installed.

In this way, according to the present invention described above, it is possible to carry out the opening/closing operation of the open/close valve 10 and the suck-back function using a single actuator 30, and it is possible to provide the integrally structured suck-back valve SV having the suck-back function in the open/close valve 10. As a result, the installation space for suck-back valve SV can be reduced, and the problem of synchronization of the actuator 30 can be solved.

In addition, by adopting the bellows 41, a large stroke can be ensured at the time of suck-back, and it is possible to increase the volume of liquid that can be sucked back. As a result, the suck-back valve SV has an increased liquid volume that can be sucked back while suppressing an increase in footprint. Moreover, the bellows 41 eliminate dead volume by filling the suck-back chamber 17; therefore, the fluid replaceability in the suck-back chamber 17 also improves.

Note that the present invention is not limited to the above-described embodiment. Various modifications can be made without departing from the spirit of the present invention.

What is claimed is:

1. A suck-back valve in which an open/close valve that includes an elastic member that biases a valve piece in an opening/closing direction carries out a valve piece opening/closing operation by receiving fluid pressure on an open/close operation portion that is provided with a piston main body and a piston biasing member and is provided with a suck-back function to prevent leakage during the fully closing operation, the suck-back valve comprising:
   a suck-back chamber formed in a valve internal channel in the open/close valve;
   a piston shaft portion that connects the piston main body and an open/close pressuring member that moves in the suck-back chamber in the axial direction to apply pressure to the valve piece; and
   bellows that accommodate the piston shaft portion inside, separating the open/close operation portion from the valve internal channel, and that are connected to the open/close pressuring member at one end and are supported by a casing at the other end;
   wherein a two-step operation is carried out at the time of closing operation of the valve piece, including a valve closing operation step in which the piston shaft portion, along with the piston main body and the open/close pressuring member, moves to the fully closed position of the valve piece, and a suck-back operation step in which the piston shaft portion and the open/close pressuring member further move from the fully closed position of the valve piece so as to increase the volume of the suck-back chamber.

2. The suck-back valve according to claim 1, wherein an outlet channel of the valve internal channel formed downstream of the valve piece passes through a concave portion formed on a bottom surface of the suck-back chamber.

3. The suck-back valve according to claim 1, wherein a suck-back volume adjusting portion that controls the amount of axial movement of the piston shaft portion is provided.

4. The suck-back valve according to claim 1, wherein the bellows are arranged such that the piston shaft portion is completely separated from the valve internal channel.

* * * * *